US007590603B2

(12) United States Patent
Zhang et al.

(10) Patent No.: US 7,590,603 B2
(45) Date of Patent: Sep. 15, 2009

(54) METHOD AND SYSTEM FOR CLASSIFYING AND IDENTIFYING MESSAGES AS QUESTION OR NOT A QUESTION WITHIN A DISCUSSION THREAD

(75) Inventors: Benyu Zhang, Beijing (CN); Zheng Chen, Beijing (CN); Hua-Jun Zeng, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 10/957,329

(22) Filed: Oct. 1, 2004

(65) Prior Publication Data

US 2006/0112036 A1   May 25, 2006

(51) Int. Cl.
*G06F 15/18* (2006.01)
(52) U.S. Cl. ............................ 706/12; 709/206; 704/1; 704/10
(58) Field of Classification Search .................. 706/12; 704/1, 8, 9, 10; 709/26, 206
See application file for complete search history.

(56) References Cited

U.S. PATENT DOCUMENTS 6,161,130 A * 12/2000 Horvitz et al. ............. 709/206
6,665,666 B1 * 12/2003 Brown et al. .................. 707/5
7,185,065 B1 * 2/2007 Holtzman et al. .......... 709/217

FOREIGN PATENT DOCUMENTS

JP        2004094521 A  *  3/2004

OTHER PUBLICATIONS

"Using SVMs for Text Categorization", Dumais, S., ieee Intelligent Systems Magazine, Trends and Controversies, Marti Hearst, ed., 13(4), Jul./Aug. 1998.*
"Text Categorization with Support Vector Machines. How to Represent Texts in Input Space?", Leopold, E., Kindermann, J., Machine Learning, 46 pp. 423-444, 2002.*
"Classification of Dialogue Acts using Prosodic Features in Chinese Spontaneous Speech", H. Sun, M-X Xu, W-H. Wu, Proceedings of the First International Conference on Machine Learning and Cybernetics, Beijing, Nov. 4-5, 2002, IEEE, pp. 1163-1166.*

(Continued)

*Primary Examiner*—David R Vincent
*Assistant Examiner*—Mai T Tran
(74) *Attorney, Agent, or Firm*—Perkins Coie LLP (57) ABSTRACT

A method and system for classifying messages of a discussion thread as questions is provided. A classification system generates a classifier to classify messages of discussion threads as question messages or non-question messages. The system trains the classifier using the feature vectors and input classifications derived from a training set of discussion threads. After the classifier is trained, the classification system uses the classifier to classify messages within a corpus of discussion threads as question or non-question messages. To classify a message, the classification system generates a feature vector for the messages and submits that feature vector to the classifier. The classifier generates a score for the message indicating a likelihood that the message is a question message.

34 Claims, 7 Drawing Sheets

OTHER PUBLICATIONS

Wensi Xi et al., "Learning Effective Ranking Functions for Newsgroup Search," Copyright 2004 ACM, SIGIR '04, Jul. 25-29, 2004, Shefield, UK (8 pages).

Eric Brill et al., "Data-Intensive Question Answering," Microsoft Research, Feb. 2002 (8 pages).

The Chi Square Statistic, http://math.hws.edu/javamath/ryan/ChiSquare.html, 2003, 7 pages [last accessed Apr. 3, 2009].

Press et al., "Numerical Recipes in C, The Art of Scientific Computing," 2d ed., Cambridge University Press, 1992, pp. 620-623.

* cited by examiner

METHOD AND SYSTEM FOR CLASSIFYING AND IDENTIFYING MESSAGES AS QUESTION OR NOT A QUESTION WITHIN A DISCUSSION THREAD

TECHNICAL FIELD

The described technology relates generally to analyzing messages within a discussion thread.

BACKGROUND

Discussion threads are a popular way for people to communicate using the Internet. A discussion thread, such as a newsgroup, allows people to participate in a discussion about a specific topic. A discussion thread is typically initiated when a person creates an initial message directed to a topic and posts the message as a new discussion thread. Other persons can read the initial message and post response messages to the discussion thread. For example, the initial message may pose a question such as "Has anyone encountered a situation where the Acme software product aborts with error number 456?" Persons who want to participate in the discussion can post response messages such as "It happens to me all the time" or "I fixed the problem by reinstalling the software." Discussion threads typically take the form of a tree structure as sequences of messages branch off into different paths. For example, three different persons can post a response message to the initial message, starting three branches, and other persons can post response messages to any one of those response messages to extend those branches.

In general, discussion threads include questions and their answers. For example, a customer support group within a company that sells a certain software product may provide a mechanism for its customers to create and participate in discussion threads relating to the software product. For example, a customer may initiate a discussion thread by posting an initial message that poses a question such as the one mentioned above. That question may be answered by the posting of a response message by another customer or a customer service representative. The corpus of discussion threads of the company may provide a vast amount of knowledge related to problems and concerns that customers may encounter along with appropriate responses (e.g., answers to questions posed).

When a customer wants an answer to a question, the customer may either initiate a new discussion thread or search messages of existing discussion threads that may provide an answer to the customer's question. When searching for an answer within the message of a corpus of discussion threads, a customer may submit a short query using keywords of the question. For example, the customer may submit the query "error 456" in hopes of finding an answer to the question mentioned above. A search engine may be used to identify those messages that contain keywords matching the query. In many instances, the messages that best match the keywords of the query are the messages that pose a similar question. The response messages may not result in a good keyword match in part because they may not repeat the keywords of the question. The most relevant message to the customer, however, may be a response message that answers the question, rather than a message that poses a similar question.

It would be desirable to have a technique that would more accurately identify a message that poses primary questions of a discussion thread ("a question message") and a message that provides answers to the primary questions ("an answer message"). In addition, when searching for messages that match a query, it would be desirable to have a technique that would provide answer messages, rather than question messages, as a query result.

SUMMARY

A method and system for classifying messages of a discussion thread as questions is provided. A classification system generates a classifier to classify messages of discussion threads as question messages or non-question messages. The system trains the classifier using the feature vectors and input classifications derived from training data of discussion threads. After the classifier is trained, the classification system uses the classifier to classify messages within a corpus of discussion threads as question or non-question messages. To classify a message, the classification system generates a feature vector for the message and submits that feature vector to the classifier. The classifier generates a score for the message indicating a likelihood that the message is a question message.

A method and system for identifying messages of discussion threads that are relevant to a query is provided. The query system executes queries against a corpus of discussion threads whose messages have been classified as question messages or non-question messages using the classifier of the classification system. The query system inputs a query from a user and then identifies the messages within the corpus that match the query. If a message of the query result is classified as a question message, then the query system may replace that question message within the query result with a corresponding answer message from the same discussion thread. Thus, the final query result may include only answer messages.

DETAILED DESCRIPTION

A method and system for classifying messages of a discussion thread as questions is provided. In one embodiment, a classification system generates a classifier to classify messages of discussion threads as question messages or non-question messages. To generate the classifier, the classification system is provided with discussion threads as training data. The classification system generates feature vectors for the messages of the discussion threads in the training data. The features of the feature vector may include information relating to question sentences within the message such as their number and positions within the message. The features may include information relating to courtesy phrases (e.g., "thank you") within the message such as their positions within the message. The features may include information relating to the length of the message and classification of an ancestor message (e.g., parent message is a question message). The features may also include information relating to indicator words of the message that may be indicative of whether the message is a question or non-question message. For example, when a discussion thread relates to customer support the indicator words may be "how," "use," "post," "run," and "help." The classification system then inputs the classification of the messages within the discussion threads of the training data as being a question or a non-question message. The system then trains a classifier using the feature vectors and input classifications. After the classifier is trained, the classification system uses the classifier to classify messages within a corpus of discussion threads as question or non-question messages. To classify a message, the classification system generates a feature vector for the messages and submits that feature vector to the classifier. The classifier generates a score for the message indicating a likelihood that the message is a question message. In this way, the classification system can be used to classify messages as question or non-question messages.

A method and system for identifying messages of discussion threads that are relevant to a query is provided. In one embodiment, the query system executes queries against a corpus of discussion threads whose messages have been classified as question messages or non-question messages using the classifier of the classification system. The query system inputs a query from a user and then identifies the messages within the corpus that match the query. The query system may use conventional techniques for identifying matching messages. For example, the query system may identify keywords of the messages (e.g., using a term frequency by inverse document frequency metric) and then identify those messages whose keywords are most similar to the words of the query as the query result. If a message of the query result is classified as a question message, then the query system replaces that question message within the query result with a corresponding answer message from the same discussion thread. Thus, the final query result may include only answer messages. The query system may also rank the messages of the query result based on relevance to the query. The query system may rank the answer messages of the query result based on relevance of the corresponding question message in the same discussion thread. That is, an answer message may be ranked not on the basis of its content directly, but on the basis of the content of the corresponding question message. The query system may alternatively rank the answer messages of the query result based on a combined relevance of the corresponding question message and the answer message itself. The query system may alternatively remove the question messages from the query result without replacing them with the corresponding answer messages. In this way, the query system can be used to identify answer messages that are relevant to a query.

Messages of a discussion thread may be generally categorized as information seeking (e.g., posing a question) or information posting (e.g., answering a question and extending a courtesy). When classifying a message, the classification system may use the categorization of other messages within the same discussion thread to help the classification. Information seeking messages can be further categorized as root questions or further questions. A message that is a root question typically starts a discussion on a topic and is typically the root message of a discussion thread. A message that is a further question may provide further information relevant to the root question. For example, the further information may be "I'm having the same problem, but I'm running a different operating system." In this case, the further question is implied and the further information may be helpful in answering the root question. Information posting messages can be further categorized as answers, courtesies, information need, information given, and root non-question. The messages that contain answers can be categorized as solid answers, agreements, or disagreements. A solid answer is a message that may provide an authoritative response to a question. An agreement is a message in which agreement is expressed with a solid answer. A disagreement is a message in which disagreement is expressed with a solid answer. A message that is categorized as a solid answer is more likely than an agreement message to be classified as an answer message that corresponds to a question message. A courtesy is a message that contains courtesies such as "Thank you" or "You are welcome." Courtesy messages may provide cues to predict the correctness or quality of a previous message. For example, if the author of the root question responds to an answer message with a courtesy message, then it might be assumed that the author is satisfied with the answer and the answer message should be considered as the primary answer to the question. Information need is a message requesting more information from a person who may be able to answer the question. For example, an information need message may ask "What operating system are you using?" Information given is a message responding to an information need message. A root non-question is a message describing useful information at the root of the discussion thread and may be provided by the facilitator of a discussion group.

In one embodiment, the classification system uses both semantic information derived from the content of a message and information derived from other messages in the same discussion thread as features of the feature vector. The feature vector may include a score for each feature indicating a likelihood that the message is a question message. One feature may be the number of question sentences in a message. Question messages tend to have more question sentences than answer messages. Because messages can vary significantly in number of sentences, the classification system may normalize the number of question sentences to a percentage of the total number of sentences within the message. Another question-based feature may be the positions of the question sentences within the message. Question messages often describe details necessary to understand a question before actually posing the question. Thus, question sentences near the end of a message may indicate a higher likelihood of a question message than question messages near the beginning. The classification system may normalize the position of the questions to a percent of the total number of sentences within the message. Another feature may be the position of the courtesy phrases within a message. A courtesy phrase at the end of the message may be an expression of courtesy ahead of time by the questioner and at the beginning may be an expression of gratitude to the answerer by the questioner. Thus, a message with a courtesy phrase at the beginning is less likely a question message. In addition, solid answer messages typically do not express gratitude. So, a message that includes a courtesy phrase (other than at the closing) is less likely a solid answer. Another feature may be the length of the message. Question messages tend to be shorter than answer messages. Other features may be based on the relationship of a message to other messages in the discussion thread. One feature may be the classification of an ancestor message, such as a parent message. If the current message is a question message, then its parent message is likely to be a question message. In contrast, if the current message is an answer message, then the parent message is very likely to be a question message. These features thus include intra-message information and inter-message information.

In one embodiment, the classification system may also use features derived from words that are known to be highly indicative of whether a message is a question or a non-question message. For example, the word "how" may be common in question messages, but uncommon in answer messages. The classification system may select indicator words manually by reviewing question and non-question messages. Alternatively, the indicator words may be learned based on analysis of the keywords of question messages and non-question messages. The classification system selects indicator words based on scores of the words in the corpus generated according to the following equation:

$$\chi^2(t) = \frac{N \times (AD - CB)^2}{(A+C) \times (B+D) \times (A+B) \times (C+D)} \quad (1)$$

where t is an indicator word, A is the number of question messages in the corpus that contain t, B is the number of non-question messages that contain t, C is the number of question messages that do not contain t, D is the number of non-question messages that do not contain t, and N is the total number of messages in the corpus. For example, the words "how," "use," "post," "run," and "help" may be selected as indicator words. The classification system may also select indicator words using document frequency, information gain, mutual information, term strength, or other techniques. The classification system may generate scores for a message for each indicator word and use those scores as features of the feature vector. The score may indicate a likelihood that the message is an answer message. In one embodiment, the score may be 1 when the message contains the indicator word, and 0 otherwise.

In one embodiment, the classification system may use a linear regression classifier or a support vector machine classifier. The classification system trains a classifier using scores of the feature vectors for the messages of the training data. A linear regression classifier is trained by generating weights that can be used to predict whether a message is a question message. A linear regression classifier can be expressed by the following equation:

$$S = \Sigma w_i s_i \quad (2)$$

where $s_i$ is the score for the $i^{th}$ feature of a message to be classified, $w_i$ is the weight of the $i^{th}$ feature, and S is the final score for the message. The dependent variable S is a boolean factor indicating whether the message is a question message (i.e., 1) or a non-question message (i.e., 0). The independent variables are the features of the feature vector. The classification may use regression analysis to find a set of weights $w_i$, which best predicts the dependent variable (i.e., the probability that a message is a question message).

In one embodiment, the classification system uses a support vector machine classifier to classify messages as question messages or non-question messages. A support vector machine operates by finding a hyper-surface in the space of possible inputs based on the training data. The hyper-surface attempts to split the positive examples (e.g., feature vector and question messages) from the negative examples (e.g., feature vector and non-question messages) by maximizing the distance between the nearest of the positive and negative examples to the hyper-surface. This allows for correct classification of messages that are similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at Microsoft's research web site at the document identified by "~jplatt/smo.html.) Alternatively, the classification system may use linear regression, logistics regression, k-nearest neighbors, and other techniques to classify messages.

In one embodiment, the classification system may use various techniques for identifying question sentences within a message. One possible technique is described in U.S. patent application Ser. No. 10/930,687, entitled "Method and System for Prioritizing Communications Based on Sentence Classifications" and filed on Aug. 31, 2004.

In one embodiment, the classification system may factor in relationships between messages of a discussion thread such as information need and information given messages. An information need message might be incorrectly classified as a question message because it does indeed contain a question. The role of the author of such a message can be used to clarify whether such a message is a question message or an information need message. For example, if the same author ultimately provided an answer message in the discussion thread, then the message is more likely an information need message than a question message. Also, when a person authors two messages within a discussion thread and both are identified as question messages, then one of the messages may be a misclassification. To compensate for such relationships, the classification system adjusts a score (e.g., returned by a classifier) indicating whether a message is a question message. In addition, the classification system may adjust a score of a message based on other cues as to whether the message is a question or not a question. For example, the classification system may reduce the score of a message based on courtesy phrases within that message.

In one embodiment, the classification system classifies messages within a corpus of discussion threads by processing the messages in order of posting along each part of the discussion thread. If a message is a root message of a discussion thread, then the classification system designates the message as a question message. Otherwise, the classification system generates a feature vector for the message and then uses the classifier (e.g., support vector machine) to generate a score indicating a likelihood that the message is a question message. A higher score may indicate that the message is more likely a question message. The classification system then adjusts the score based on the courtesy information within the message. The classification system also adjusts the score based on the author's relationship to other messages within the discussion thread. For example, if another of the author's messages was categorized as a question message, then this message is less likely a question message. If the score is greater than zero, then the classification system designates the message as a question message, else the classification system designates the message as a non-question message. The classification system then continues with the next message. The classification system may identify answer messages from the non-question messages by training a classifier to classify messages (e.g., solid answers, agreement messages, and disagreement messages) as answers or not answers in much the same way the classification system trained the classifier for question messages.

In one embodiment, the query system ranks messages of the query result according to their relevance to the query. The query system may combine the relevance of the answer message of the query result with the relevance of the corresponding question message of the query result. The system may combine the relevances according to the following equation:

$$ranking = \alpha \times relevance_q + (1-\alpha) \times relevance_a \quad (3)$$

where α is a weight factor (e.g., 0.5) indicating the weight for the question message and $relevance_q$ and $relevance_a$ represent the relevance of the question message and answer message, respectively.

Figure 1:
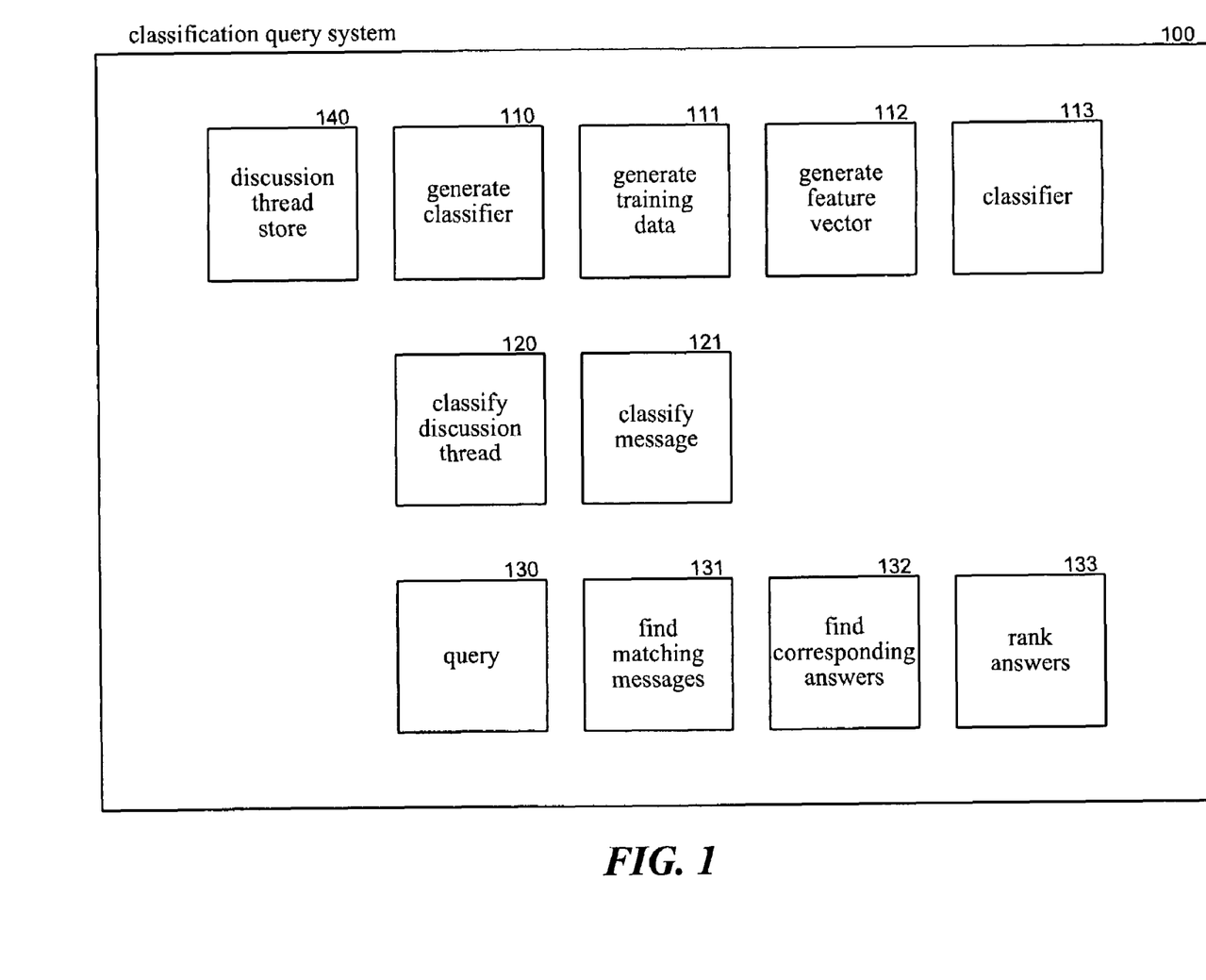
FIG. 1 is a block diagram that illustrates components of the classification and query system in one embodiment.

FIG. 1 is a block diagram that illustrates components of the classification and query system in one embodiment. The system 100 includes a generate classifier component 110, a classify discussion thread component 120, and a query component 130. The generate classifier component generates a classifier 113 by invoking a generate training data component 111 and a generate feature vector component 112. The generate training data component selects training data from a discussion thread store 140 and inputs the classification of the messages of the training data. The generate feature vector component generates a feature vector for each message of the training data. The generate classifier component then trains the classifier using the feature vectors and the input classifications. The classify discussion thread component selects the remaining discussion threads of the discussion thread store (i.e., those not in the training data) and invokes a classify message component 121 for each message of the remaining discussion threads to classify the messages. The classify discussion thread component then updates the discussion thread store with the classification of the messages. The query component inputs a query and invokes a find matching messages component 131 to find the messages of the discussion thread store that match the query, which form the query result. The query component then invokes a find corresponding answers component 132 to find answer messages corresponding to question messages in the query result and replaces the question messages. The query component invokes a rank answer messages component 133 to rank the answer messages according to relevance.

The computing device on which the classification and query system is implemented may include a central processing unit, memory, input devices (e.g., keyboard and pointing devices), output devices (e.g., display devices), and storage devices (e.g., disk drives). The memory and storage devices are computer-readable media that may contain instructions that implement the classification and query system. In addition, the data structures and message structures may be stored or transmitted via a data classification and query medium, such as a signal on a communications link. Various communication links may be used, such as the Internet, a local area network, a wide area network, a point-to-point dial-up connection, a cell phone network, and so on.

The classification and query system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The client computer systems may be cell phones, personal digital assistants, smart phones, personal computers, programmable consumer electronics, digital cameras, and so on.

The classification and query system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
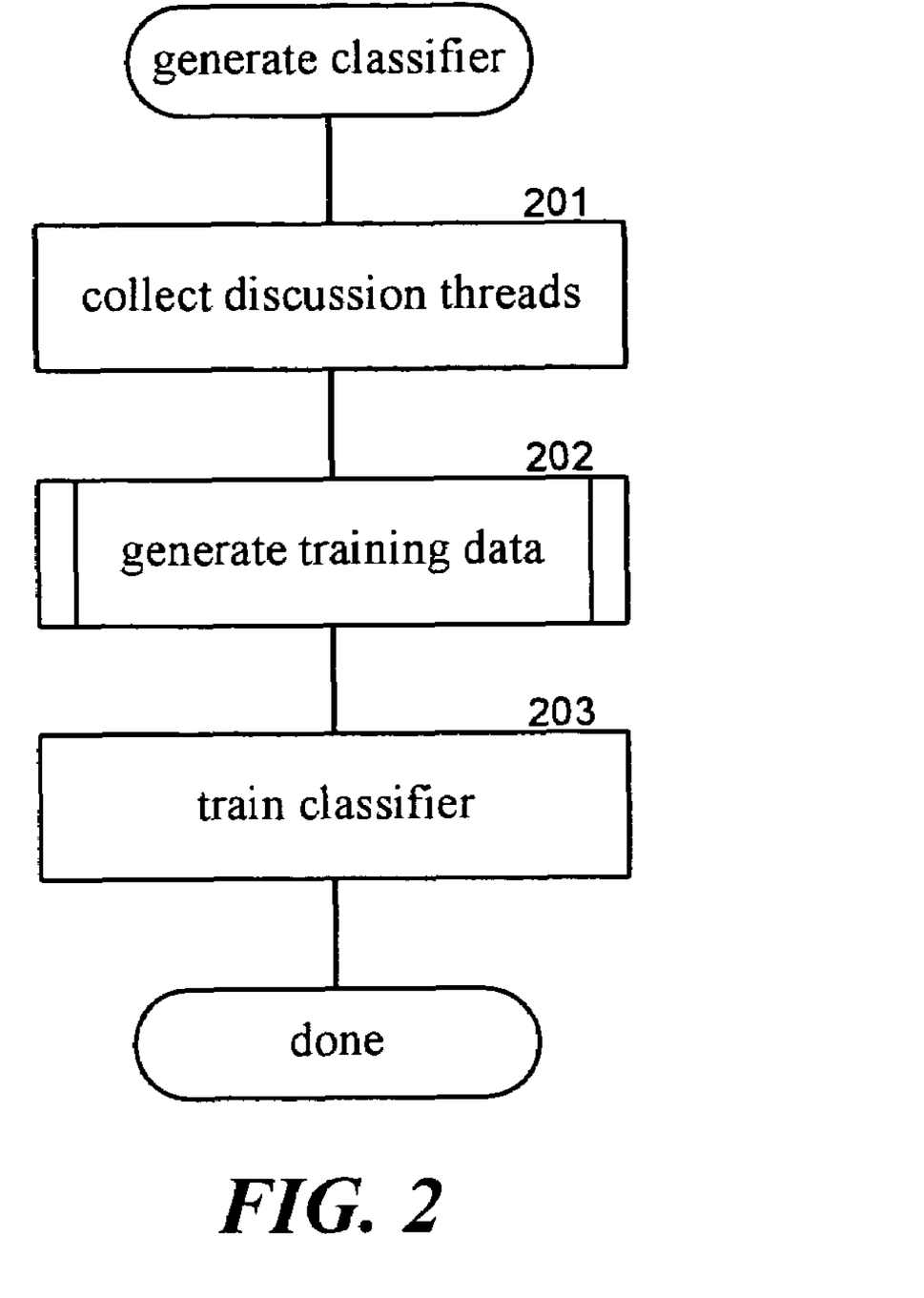
FIG. 2 is a flow diagram that illustrates the processing of the generate classifier component in one embodiment.

FIG. 2 is a flow diagram that illustrates the processing of the generate classifier component in one embodiment. In block 201, the component collects discussion threads as training data from the discussion thread store. In block 202, the component invokes the generate training data component to generate training data (i.e., a feature vector and classification for each message of the training data). In block 203, the component then the trains the classifier using the generated training data and then completes.

Figure 3:
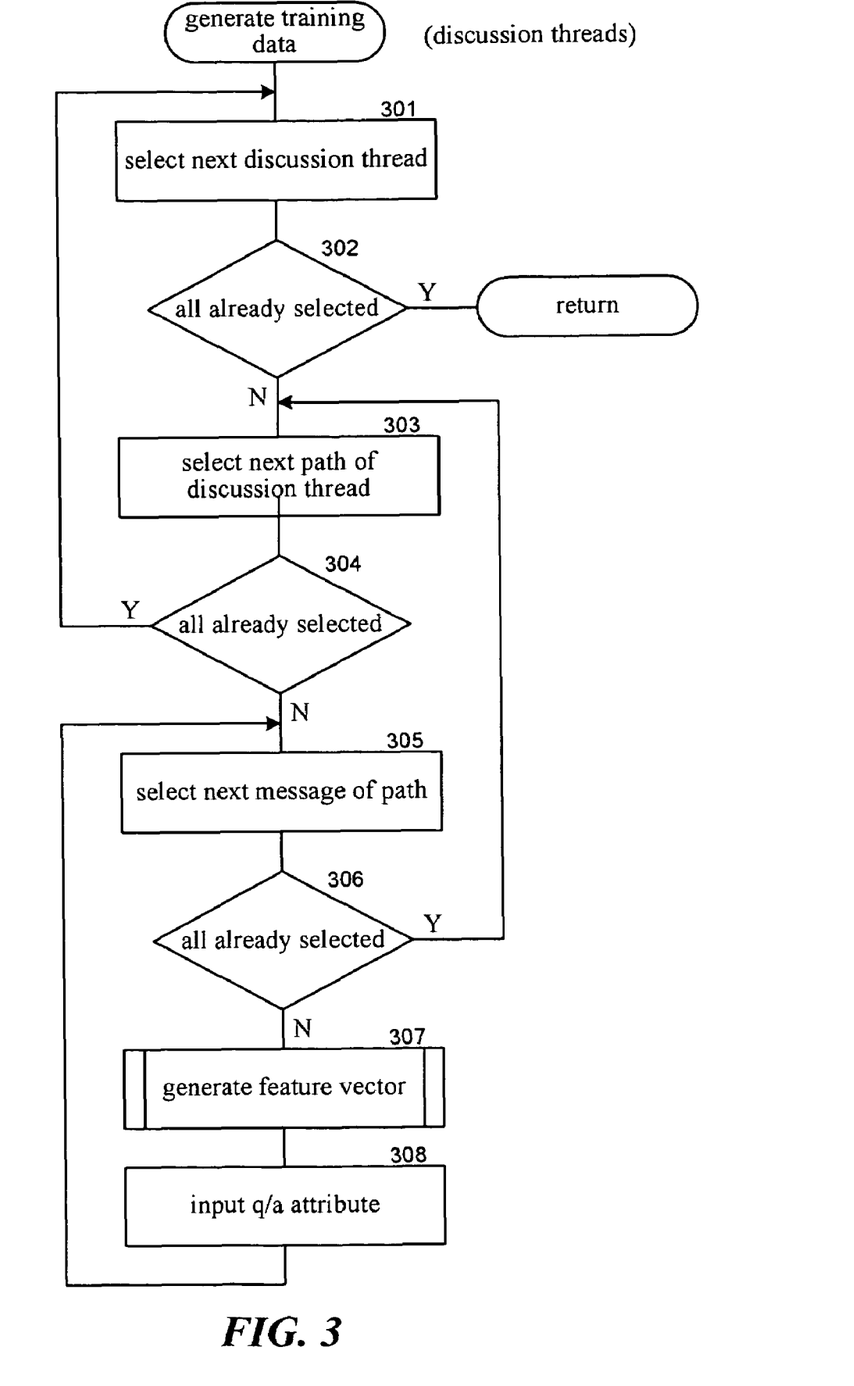
FIG. 3 is a flow diagram that illustrates the processing of the generate training data component in one embodiment.

FIG. 3 is a flow diagram that illustrates the processing of the generate training data component in one embodiment. The component is passed discussion threads that are to be used as the training data. The component loops selecting each message within each discussion thread and generating a feature vector for the message and inputting a classification of whether the message is a question message. In block 301, the component selects the next discussion thread. In decision block 302, if all the discussion threads have already been selected, then the component returns, else the component continues at block 303. In block 303, the component selects the next path of the selected discussion thread. In decision block 304, if all the paths of the selected discussion thread have already been selected, then the component loops to block 301 to select the next discussion thread, else the component continues at block 305. A path of a discussion thread includes all the messages from the root message of the discussion thread to a leaf message. In block 305, the component selects the next message of the selected path that has not been previously selected. A message may have been previously selected if it was on a previously selected path of the discussion thread. In decision block 306, if all such messages of the selected path have already been selected, then the component loops to block 303 to select the next path of the selected discussion thread, else the component continues at block 307. In block 307, the component invokes the generate feature vector component to generate a feature vector for the selected message. In block 308, the component inputs a classification of the selected message. The component then loops to block 305 to select the next message of the selected path.

Figure 4:
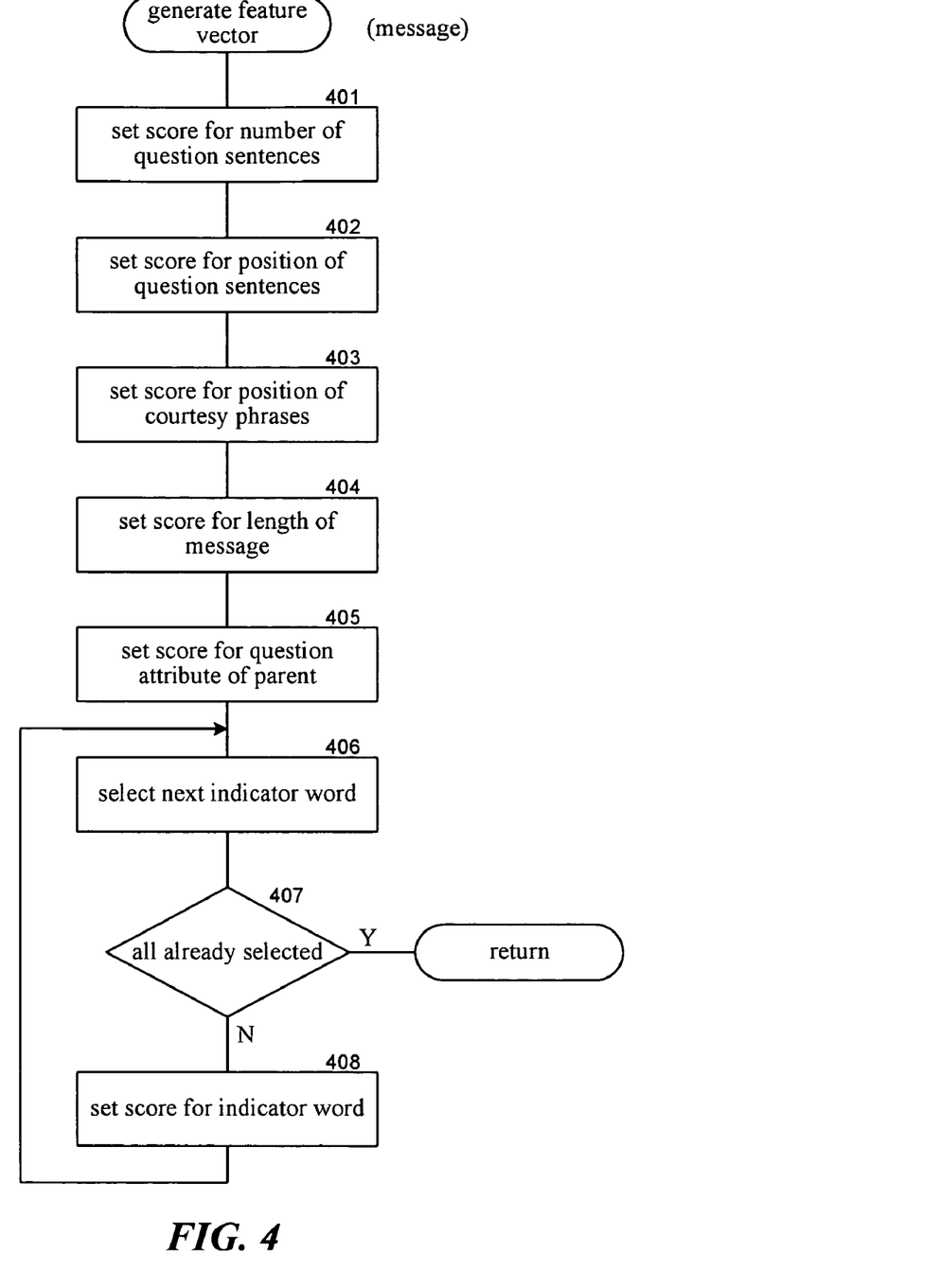
FIG. 4 is a flow diagram that illustrates the processing of the generate feature vector component in one embodiment.

FIG. 4 is a flow diagram that illustrates the processing of the generate feature vector component in one embodiment. The component is passed a message and generates a feature vector for the message. In block 401, the component identifies the question sentences within the passed message and sets a feature score based on the number of question sentences. In block 402, the component sets another feature score based on the positions of the question sentences within the passed message. In block 403, the component identifies the courtesy phrases within the passed message. The component then sets a feature score based on the position of the courtesy phrases. In block 404, the component sets a feature score based on the length (e.g., number of words or sentences) of the passed message. In block 405, the component sets a feature score based on whether the parent message is a question message. In blocks 406-409, the component loops setting feature scores based on the indicator words. In block 406, the component selects the next indicator word. In decision block 407, if all the indicator words have already been selected, then the component returns, else the component continues at block 408. In block 408, the component sets a feature score for the selected indicator word based on whether it is in the passed message and then loops to block 406 to select the next indicator word.

Figure 5:
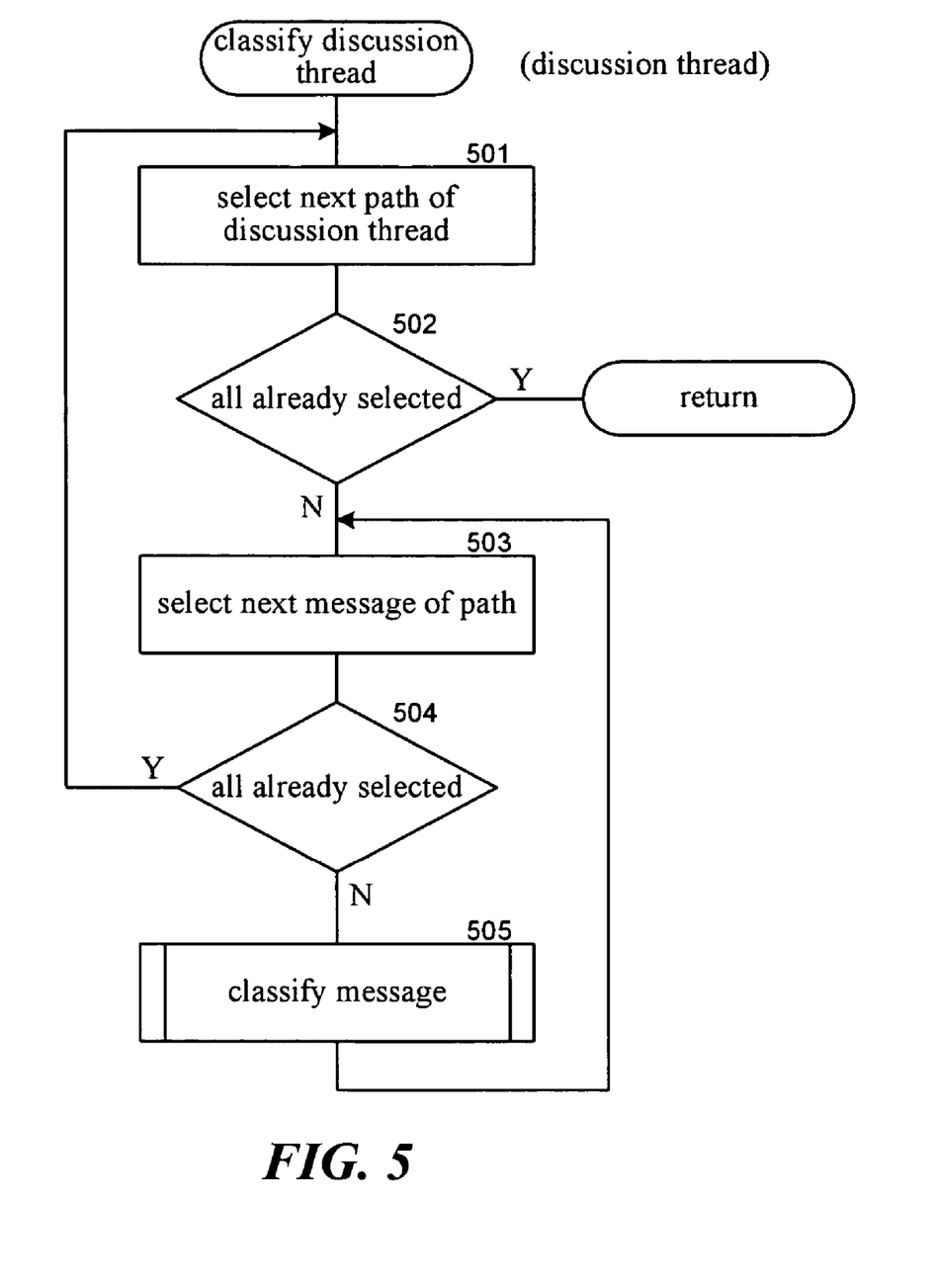
FIG. 5 is a flow diagram that illustrates the processing of the classify discussion thread component in one embodiment.

FIG. 5 is a flow diagram that illustrates the processing of the classify discussion thread component in one embodiment. The component is passed a discussion thread and uses the classifier to classify each message within the discussion thread. In block 501, the component selects the next path of the passed discussion thread. In decision block 502, if all the paths have already been selected, then the component returns, else the component continues at block 503. In block 503, the component selects the next message of the selected path that has not already been selected. In decision block 504, if all the messages of the selected path have already been selected, then the component loops to block 501 to select the next path of the passed discussion thread, else the component continues at block 505. In block 505, the component invokes the classify message component to classify the selected message and then loops to block 503 to select the next message of the selected path.

Figure 6:
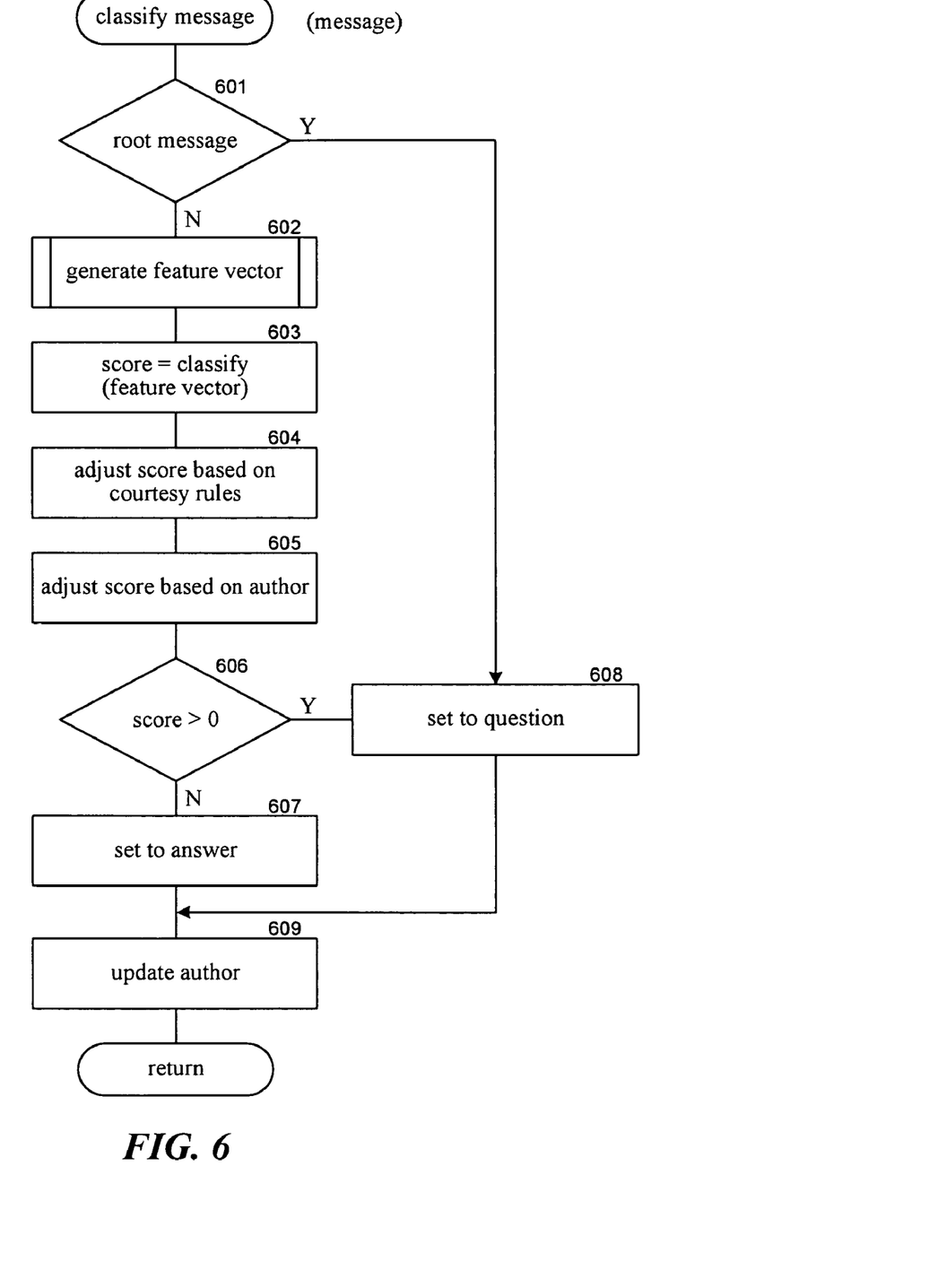
FIG. 6 is a flow diagram that illustrates the processing of the classify message component in one embodiment.

FIG. 6 is a flow diagram that illustrates the processing of the classify message component in one embodiment. The component is passed a message, generates a feature vector for the message, scores the likelihood that the message is a question message, and then classifies the message as a question or non-question message. In decision block 601, if the passed message is a root message of its discussion thread, then the component assumes that the message is a question message and continues at block 608, else the component continues at block 602. In block 602, the component invokes the generate feature vector component to generate the feature vector for the passed message. In block 603, the component invokes the classifier passing the generated feature vector to generate a score indicating whether the message is a question message. In block 604, the component adjusts the score based on courtesy phrases within the passed message. In block 605, the component adjusts the score based on other messages within the same discussion thread that the same person authored. In decision block 606, if the score is greater than zero, then the component continues at block 608, else the component continues at block 607. In block 607, the component classifies the passed message as a non-question message. In block 608, the component classifies the passed message as a question message. In block 609, the component updates information related to the author for use in adjusting the scores for subsequent messages. The component then returns. One skilled in the art will appreciate that the adjusting of the scores could be represented as features of the feature vector and factor into the training of the classifier.

Figure 7:
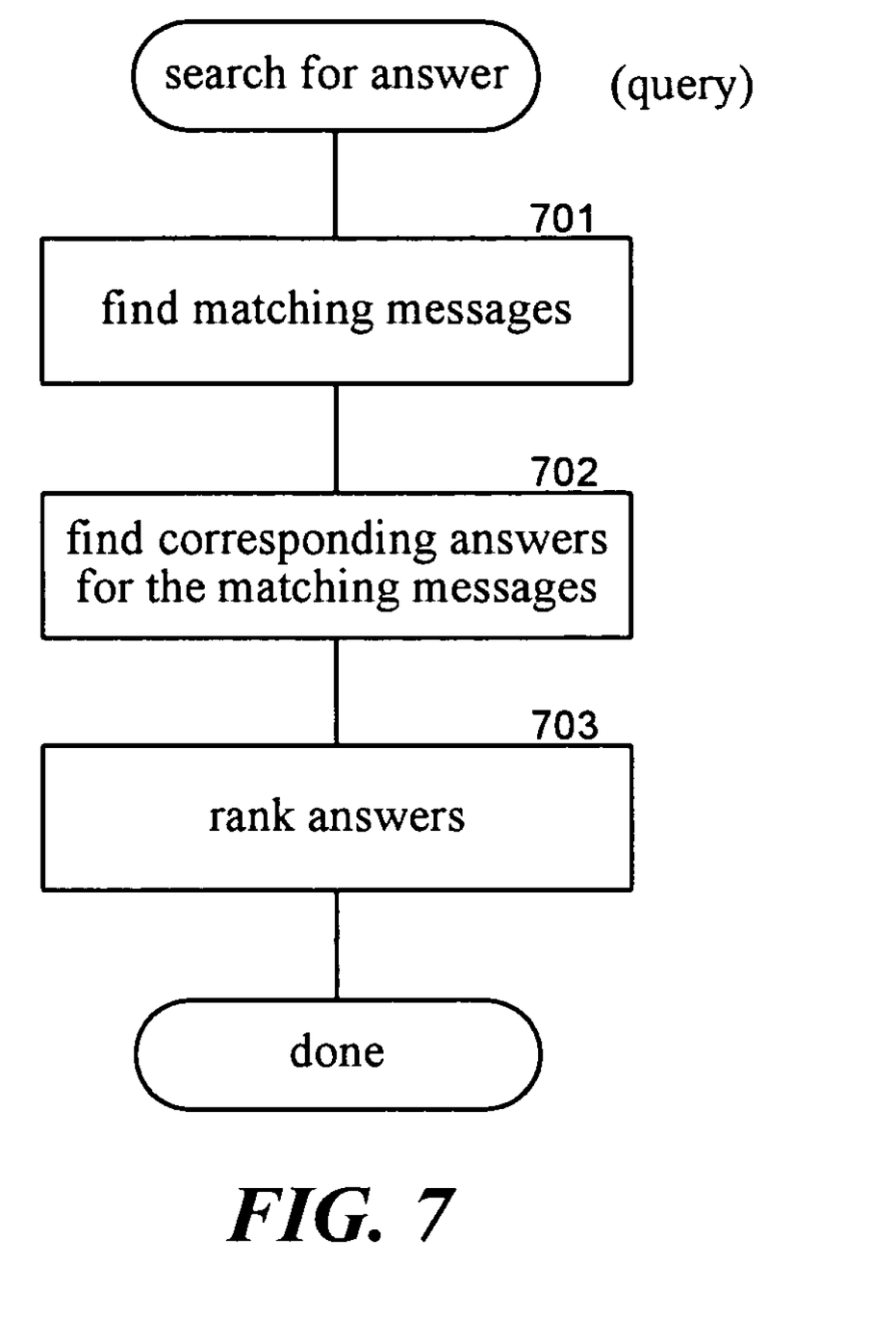
FIG. 7 is a flow diagram that illustrates the processing of the query component in one embodiment.

FIG. 7 is a flow diagram that illustrates the processing of the query component in one embodiment. The component is passed a query that is input by a user and identifies answer messages that are related to the query. In block 701, the component finds matching messages within the discussion thread store. In block 702, the component replaces matching question messages with the corresponding answer messages from the same discussion threads. In block 703, the component ranks the answer messages and then completes.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a computer system with a processor for classifying a message of a discussion thread as a question or not a question, the method comprising:

providing training data including discussion threads having messages;

generating by the processor feature vectors of messages of the provided training data, the feature vectors being based on indicator words of the messages identified in accordance with the following equation:

$$\chi^2(t) = \frac{N \times (AD - CB)^2}{(A+C) \times (B+D) \times (A+B) \times (C+D)}.$$

where t is an indicator word, A is the number of question messages in the training data that contain t, B is the number of non-question messages that contain t, C is the number of question messages that do not contain t, D is the number of non-question messages that do not contain t, and N is the total number of messages in the training data;

providing classifications of messages of the provided training data as questions or not questions;

training by the processor a classifier using the generated feature vectors and provided classifications of messages of the provided training data; and after the classifier is trained, receiving an unclassified message of a discussion thread; and classifying by the processor the received message of the discussion thread as a question or not a question using the trained classifier.

2. The method of claim 1 wherein the classifier is a support vector machine classifier.

3. The method of claim 1 wherein the classifier is a linear regression classifier.

4. The method of claim 1 wherein the classifier is a k-nearest neighbor classifier.

5. The method of claim 1 wherein the feature vector includes information relating to a question within a message.

6. The method of claim 5 wherein the information relating to a question includes number of question sentences within the message.

7. The method of claim 5 wherein the information relating to a question includes position of question sentences within the message.

8. The method of claim 1 wherein the feature vector includes information relating to a courtesy phrase within a message.

9. The method of claim 8 wherein the information relating to a courtesy phrase includes position of a courtesy phrase within a message.

10. The method of claim 1 wherein the feature vector includes information relating to length of a message.

11. The method of claim 1 wherein the feature vector includes information relating to classification of an ancestor message.

12. The method of claim 11 wherein the ancestor message is a parent message.

13. The method of claim 1 wherein the feature vector includes information relating to indicator words of a message.

14. The method of claim 13 wherein the indicator words include how, use, post, run, and help.

15. The method of claim 1 including:

receiving a query;

identifying messages that match the query; and when an identified message is classified as a question, replacing the identified message with a corresponding answer message from the same discussion thread as the identified message.

16. The method of claim 15 wherein the answer messages are ranked based on relevance of the answer messages to the query.

17. The method of claim 15 wherein the answer messages are ranked based on relevance of corresponding question messages.

18. A computer-readable storage medium containing instructions for controlling a computer system to identify messages of discussion threads that are relevant to a query, by a method comprising:
  training a classifier to classify messages as questions or non-questions based on feature vectors of the messages;
  classifying messages of discussion threads as questions or non-questions using the trained classifier; and
  upon receiving a query,
    identifying messages of a discussion thread that match the query wherein the identified messages that are answers are relevant to the query;
    identifying answer messages for identified messages that are classified as questions, each identified answer message being from the same discussion thread as the identified message; and
    displaying the identified answer messages as messages that are relevant to the query.

19. The computer-readable storage medium of claim 18 wherein the training includes:
  providing training data that includes discussion threads having messages;
  generating feature vectors of messages of the provided discussion threads; and
  providing classifications of messages of the provided training data as questions or non-questions.

20. The computer-readable storage medium of claim 19 wherein the feature vector includes information relating to a question within a message.

21. The computer-readable storage medium of claim 19 wherein the feature vector includes information relating to a courtesy phrase within a message.

22. The computer-readable storage medium of claim 19 wherein the feature vector includes information relating to length of a message.

23. The computer-readable storage medium of claim 19 wherein the feature vector includes information relating to classification of an ancestor message.

24. The computer-readable storage medium of claim 19 wherein the feature vector includes information relating to indicator words of a message.

25. The computer-readable storage medium of claim 18 wherein the identified messages are ranked based on corresponding relevance to the query of question messages associated with the identified messages.

26. A computer-readable storage medium containing instructions for controlling a computer system to identify messages of discussion threads that are relevant to a query, by a method comprising:
  providing discussion threads with messages that are classified as a question or not a question;
  receiving the query;
  identifying messages of the provided discussion threads that match the query; and
  when an identified message of a discussion thread is classified as a question, replacing the identified message with a message of the discussion thread that provides an answer,
wherein the identified messages that provide answers are relevant to the query.

27. The computer-readable storage medium of claim 26 wherein the identifying includes:
  providing training data that includes discussion threads having messages;
  generating feature vectors of messages of the provided training data;
  providing classifications of messages of the provided training data as questions or not questions; and
  training a classifier based on the generated feature vectors and provided classifications of the messages of the provided training data;
  wherein the messages of the provided discussion threads are classified as a question or not a question using the trained classifier.

28. The computer-readable storage medium of claim 27 wherein the feature vector includes information relating to a question within a message.

29. The computer-readable storage medium of claim 27 wherein the feature vector includes information relating to a courtesy phrase within a message.

30. The computer-readable storage medium of claim 27 wherein the feature vector includes information relating to length of a message.

31. The computer-readable storage medium of claim 27 wherein the feature vector includes information relating to classification of an ancestor message.

32. The computer-readable storage medium of claim 27 wherein the feature vector includes information relating to indicator words of a message.

33. The computer-readable storage medium of claim 27 wherein the identified messages are ranked based on relevance of the identified messages to the query.

34. The computer-readable storage medium of claim 27 wherein the identified messages are ranked based on corresponding relevance to the query of question messages associated with the identified messages.

* * * * *

UNITED STATES PATENT AND TRADEMARK OFFICE
CERTIFICATE OF CORRECTION

PATENT NO. : 7,590,603 B2
APPLICATION NO. : 10/957329
DATED : September 15, 2009
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 562 days.

Signed and Sealed this

Twenty-first Day of September, 2010

David J. Kappos
*Director of the United States Patent and Trademark Office*